UNITED STATES PATENT OFFICE.

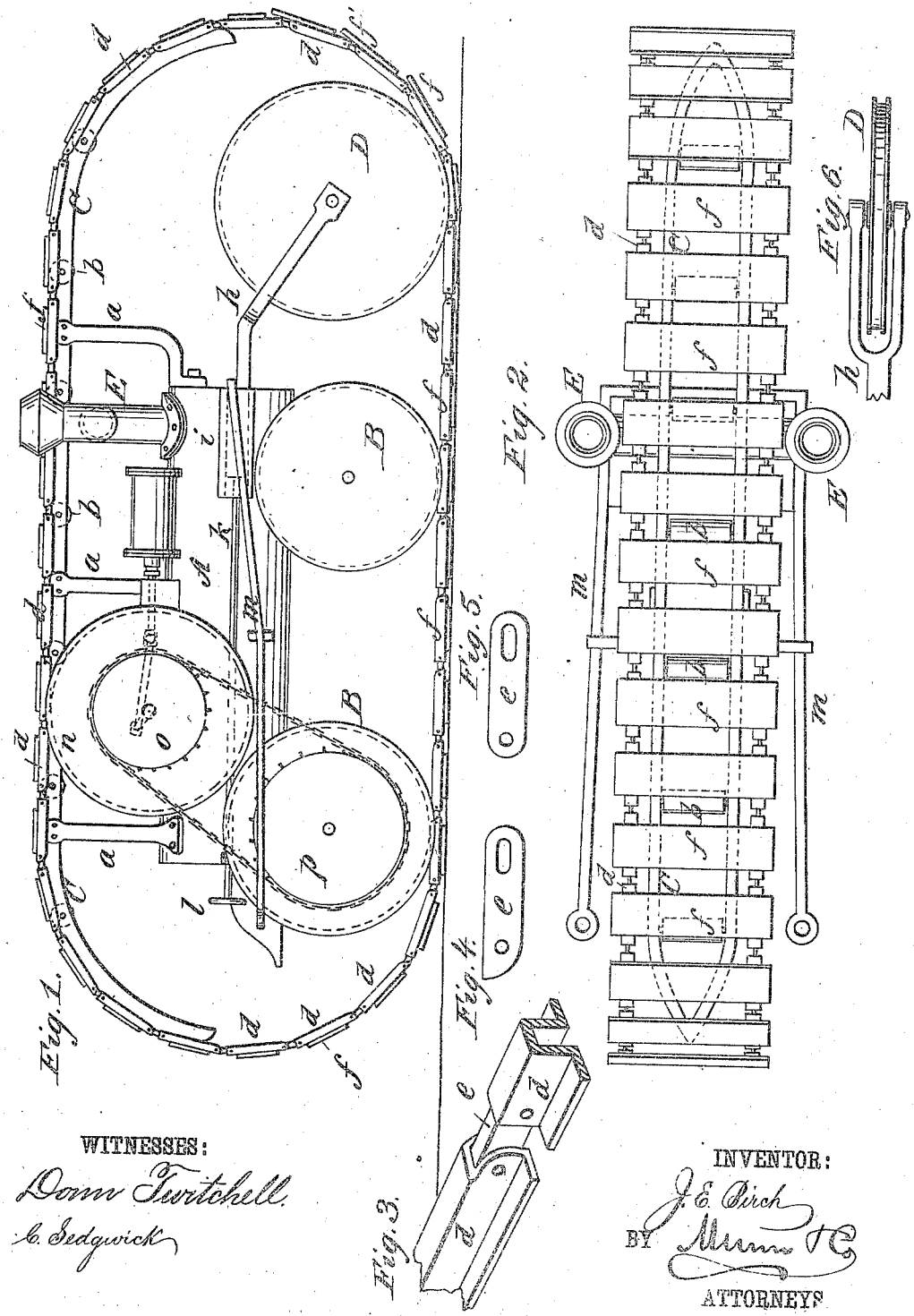

JOHN E. BIRCH, OF WINNIPEG, MANITOBA, CANADA.

TRACTION-ENGINE.

SPECIFICATION forming part of Letters Patent No. 288,763, dated November 20, 1883.

Application filed June 8, 1883. (No model.)

*To all whom it may concern:*

Be it known that I, JOHN EDWARD BIRCH, of Winnepeg, in the county of Selkirk, in the Province of Manitoba and Dominion of Canada, have invented a new and Improved Traction-Engine, of which the following is a full, clear, and exact description.

The object of my invention is to furnish a traction-engine, either for road or farm work, that can be used upon soft or yielding ground.

Reference is to be had to the accompanying drawings, forming a part of this specification, in which similar letters of reference indicate corresponding parts in all the figures.

Figure 1 is a side elevation of a traction-engine of my improved construction. Fig. 2 is a plan view of the same. Fig. 3 is a detail perspective view, showing the construction of the endless rails or tracks. Figs. 4, 5, and 6 are detail views.

The boiler A and other parts may be of any ordinary character, and mounted upon wheels B B at the front and rear.

Above the engine, and supported by standards $a\ a$, is a frame, C, of angle-iron, having its ends curved downward and provided at intervals with rollers $b\ b$ for support of the endless track. The endless track is made of sections $d\ d$, of the shape shown in Fig. 3, which are connected together by bars or links $e$, held by rivets or pins passing through the sections $d$ at their ends. These links $e$ may be made in the form shown either in Fig. 4 or Fig. 5. The form shown in Fig. 4 gives rigidity to the endless tracks as they pass beneath the wheels B, and the form shown in Fig. 5 gives a track flexible in every position. To the sections D are attached ties or plates $f$, which are preferably made of wood, and are of suitable length and width, so as to procure a broad bearing upon the ground.

D D are wheels, which I call "distributing-wheels," hung in the forks of side arms, $h$, that are supported at the forward end of the engine by means of boxes $i$, which are attached at opposite sides of the boiler A, and to the arms $h$ are connected rods $k$, that extend to the rear and terminate within the cab of the engine, where they are provided with hand-wheels $l$, for operation to move the rods $k$ endwise, and thereby project the wheels D more or less.

The endless tracks pass beneath the wheels D, and by the inward and outward adjustment of these wheels, as described, the track is lengthened or shortened—that is, made to bear more or less upon the ground at either side—for the purpose of turning the engine in either direction, as desired.

At $m$, on the sides of the engine, are bars extending outside of the ties or plates $f$, and serving as a means for connection to a plow or other article which is to be drawn along by the engine. The smoke-stack E is divided at its upper end into two portions, that extend in opposite directions to the outside of the endless track, and thence upward above the track. The driving-shaft upon the engine is provided with fly-wheels $n$, upon which the track bears, and a chain-wheel, $o$, at each end, from which chains pass to chain-wheels $p$ upon the axle of the rear wheels, B.

These devices may be applied to any ordinary engine, so as to convert it into a traction-engine for the purposes named.

By the use of the ties or plates combined with an endless track in the manner shown, I obtain an extensive bearing-surface for support of the engine upon soft or spongy ground, so that there will be no danger of miring or of the engine becoming useless by the wheels sinking in the ground.

As shown the wheels are flanged; but smooth-faced wheels resting upon the inner flanges of the track-sections may be used. I do not limit myself in this respect.

The connecting-links $e$ of the track-sections are slotted, as shown, for making allowance in the travel of the wheels, as in turning, and to insure greater rigidity to the track the ties $f$ may be secured upon the track-sections in such manner as to break joints with the said sections, as shown at $f''$ in Fig. 1.

Having thus fully described my invention, I claim as new and desire to secure by Letters Patent—

1. The endless track of a traction-engine formed of the channeled and side flanged sections, d, the pivoted bars e, having a hole at one end and a slot at the other, and the ground-plates f, as shown and described.

2. The combination, with the boiler, of the boxes i, arranged on each side thereof, and end forked arms, h, provided with bearings and carrying wheels D, as shown and described.

3. The combination, with the arms h, arranged in boxes i and carrying wheels D, of the rods k, having hand-wheels to regulate the position of wheels D, as described.

4. The combination, with an endless track on a traction-engine, of wheels D, adapted to be projected more or less, and thus shorten or lengthen the ground-bearing of the track, as described.

JOHN EDWARD BIRCH.

Witnesses:
WILLIAM GOODWIN,
JAMES BUTTERS.